(12) United States Patent
Senba

(10) Patent No.: US 7,590,340 B2
(45) Date of Patent: Sep. 15, 2009

(54) ELECTRONIC CAMERA HAVING IMPROVED FOCUS PERFORMANCE

(75) Inventor: Takehiko Senba, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 421 days.

(21) Appl. No.: 11/528,557

(22) Filed: Sep. 28, 2006

(65) Prior Publication Data

US 2007/0071432 A1     Mar. 29, 2007

(30) Foreign Application Priority Data

Sep. 29, 2005 (JP) .............................. 2005-283485

(51) Int. Cl.
G03B 3/10 (2006.01)
G03B 13/34 (2006.01)

(52) U.S. Cl. ...................................... 396/121; 396/123

(58) Field of Classification Search ................ 396/532, 396/121, 123; 348/E5.045, 345, 361
See application file for complete search history.

(56) References Cited

U.S. PATENT DOCUMENTS

| | | | | |
|---|---|---|---|---|
| 5,212,516 | A * | 5/1993 | Yamada et al. | 348/354 |
| 6,556,784 | B2 * | 4/2003 | Onuki | 396/52 |
| 6,765,618 | B1 * | 7/2004 | Sato | 348/348 |
| 6,900,841 | B1 * | 5/2005 | Mihara | 348/345 |
| 6,940,555 | B2 * | 9/2005 | Okisu et al. | 348/345 |
| 7,292,280 | B2 * | 11/2007 | Yamazaki et al. | 348/363 |
| 2005/0157178 | A1 * | 7/2005 | Miyata | 348/207.99 |
| 2005/0212949 | A1 * | 9/2005 | Tokiwa et al. | 348/340 |
| 2005/0249429 | A1 * | 11/2005 | Kitamura | 382/255 |
| 2006/0008264 | A1 * | 1/2006 | Yamaguchi et al. | 396/121 |
| 2006/0023070 | A1 * | 2/2006 | Nakamura et al. | 348/207.99 |
| 2006/0216023 | A1 * | 9/2006 | Tokiwa et al. | 396/532 |
| 2006/0233545 | A1 * | 10/2006 | Senba et al. | 396/529 |
| 2006/0268158 | A1 * | 11/2006 | Ishiyama et al. | 348/373 |
| 2006/0291842 | A1 * | 12/2006 | Tokiwa et al. | 396/56 |

FOREIGN PATENT DOCUMENTS

| | | | |
|---|---|---|---|
| JP | 2002-209135 | A | 7/2002 |
| JP | 2002-333569 | A | 11/2002 |
| JP | 2003-121913 | * | 4/2003 |
| JP | 2003-156790 | * | 5/2003 |
| JP | 2004-040740 | A | 2/2004 |
| JP | 2005-025055 | A | 1/2005 |

* cited by examiner

Primary Examiner—Rodney E Fuller
(74) Attorney, Agent, or Firm—Sughrue Mion, PLLC

(57) ABSTRACT

An image is divided into areas in accordance with degrees of focusing. As the divided areas, there are a focus area and a non-focus area. With respect to the non-focus area, the image thereof is processed so as to emphasize its blur. In contrast, with respect to the focus area, the image thereof is processed so as to emphasize its sharpness. The processed image is displayed on a monitor so that perspective is expressed like a single-lens reflex.

14 Claims, 5 Drawing Sheets

ELECTRONIC CAMERA HAVING IMPROVED FOCUS PERFORMANCE

FIELD OF THE INVENTION

The present invention relates to an electronic camera in which focus performance is improved by emphasizing perspective of an image displayed on an LCD.

BACKGROUND OF THE INVENTION

In recent years, electronic cameras are popularly used. In this kind of the electronic camera, image data captured by means of a CCD image sensor and so forth is converted into digital data and is stored in a memory. Meanwhile, storage capacity of the memory increases in accordance with high integration thereof and moving-image compression technique is improved so that it becomes possible to take a moving image. Consequently, some of the commercial electronic cameras are capable of performing both of still-image shooting and moving-image shooting.

When shooting is performed with the electronic camera, it is possible to utilize an LCD panel as an electronic viewfinder besides a built-in optical viewfinder. On the LCD panel, a subject image formed on the CCD image sensor is continuously displayed. Many electronic cameras are provided with an autofocus function of an active system using infrared rays, for the purpose of performing focus adjustment at a time of shooting. Among the electronic cameras, there is a single-lens reflex type provided with a manual focus function capable of manually adjusting the focus.

When the manual focus function is used in taking an image, a shooter visually finds a focal point by utilizing the LCD panel and the optical viewfinder. However, since a pixel number of the LCD panel is extremely small in comparison with that of the image sensor, the image displayed thereon is grainy and it is difficult to finely perform the focus adjustment. Moreover, when the LCD panel is used, quality of the viewfinder image displayed thereon further deteriorates due to dropping frames of the subject image continuously displayed.

In this regard, Japanese Patent Laid-Open Publication No. 2002-209135 proposes a method in which focus aid is performed by using a width of an edge detected from an image at a time when the focus is manually adjusted in the electronic camera. A user judges a degree of focus on the basis of a bar graph showing an evacuation result of the edge displayed on the LCD panel.

Japanese Patent Laid-Open Publication No. 2004-040740 proposes a method in which a stop is vertically moved relative to an optical axis and a focus condition is displayed on the basis of image fluctuation to perform the focus adjustment. An aperture stop is provided so as to be movable at an optical path of a subject from side to side. A split image is produced from images obtained when the aperture stop is shifted to the right side and to the left side. The produced split image is displayed on a monitor.

Japanese Patent Laid-Open Publication No. 2005-025055 proposes a method in which a user manually and correctly performs focus adjustment of a taking lens even when the attached taking lens is not supported by the autofocus function. A focal position of a manual focus lens is detected by using an AF sensor. At the identical lens position, the focal position is detected in another way on the basis of contrast change of a subject image formed on an image sensor. Based on the result of the detected focal positions, a built-in main CPU calculates correction data for correcting a focus shift amount in displaying focus aid. On the basis of the calculated correction data, the focus aid is displayed.

In Japanese Patent Laid-Open Publication No. 2002-333569, low-pass filter processing of an image is abbreviated to facilitate focus adjustment performed by using a monitor image.

However, some of the above-mentioned methods are complicated and it is generally difficult to adjust the focus because a change of the focus is confusing in the manual focus using an electronic camera comprising a monitor of an LCD viewfinder type or the like. Further, there is an unsolved fatal problem in that it is turned out after shooting that the focus was not adjusted even though the focus seemed to be adjusted on the monitor.

SUMMARY OF THE INVENTION

In view of the foregoing, it is a primary object of the present invention to provide an electronic camera in which a taken image is divided into areas in accordance with degrees of focusing and the image is displayed so as to emphasize a blur with respect to a non-focus area and so as to emphasize sharpness with respect to a focus area.

In order to achieve the above and other objects, the electronic camera according to the present invention comprises a focus-degree judging part, an image dividing part, a processor and a monitor. The focus-degree judging part partitions the image into plural blocks to judge a degree of focusing relative to each of the blocks. The image dividing part groups the blocks on the basis of the judged degree of focusing to divide the image into plural areas every gathering of the grouped blocks. The processor performs different image processing with respect to each of the areas. The monitor displays the image processed by the processor.

In a preferred embodiment, the electronic camera further comprises a mode changer for switching a first mode and a second mode. Under the first mode, the identical image processing is performed for the entire image. Under the second mode, different image processing is performed for each of the divided areas.

It is preferable that the electronic camera further comprises a focus changer for changing an autofocus and a manual focus. In this case, the second mode is automatically set when the manual focus is selected by the focus changer.

In another embodiment, the electronic camera includes a detachable lens unit containing an image sensor, and an emphasis degree of image processing is changed in accordance with a kind of a lens contained the selectively attached lens unit.

It is preferable that the emphasis degree of image processing is adjustable in accordance with properties of the monitor.

According to the present invention, perspective is emphasized and is expressed on the monitor like a single-lens reflex. Since a user can easily recognize a focus change on the monitor, a focal position is correctly and easily adjusted. In virtue of this, the user can enjoy taking a beautiful picture with the electronic camera.

In the case that the electronic camera includes the detachable lens unit, the emphasis degree of image processing is changed in accordance with the kind of lens of the selectively attached lens unit. In virtue of this, the user can enjoy taking a beautiful picture without regard to the kind of the lens contained in the lens unit.

DESCRIPTION OF THE PREFERRED EMBODIMENTS

Figure 1:
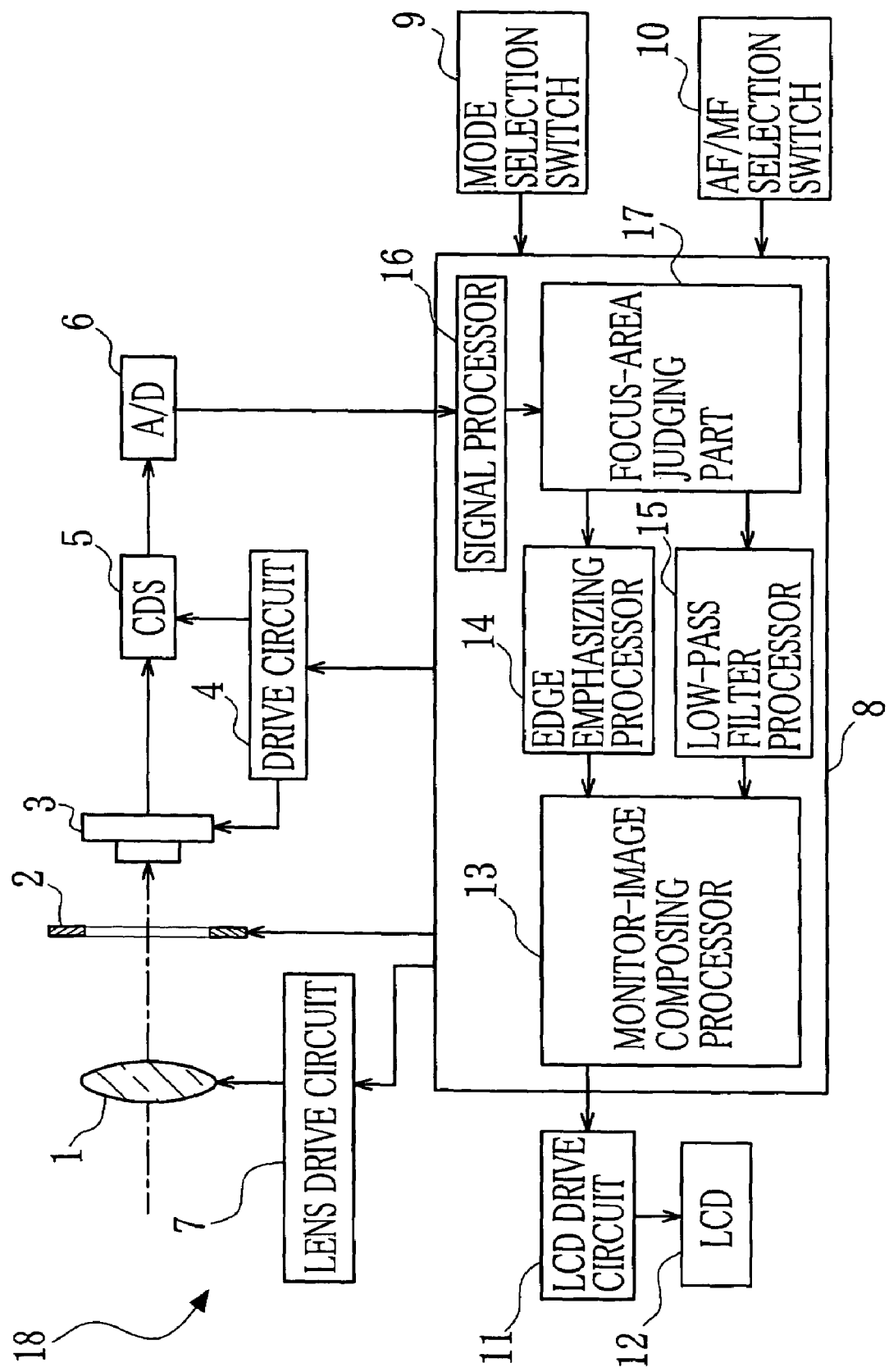
FIG. 1 is a block diagram of a camera system according to the present invention.

An embodiment of the present invention is described below with reference to drawings. FIG. 1 is a block diagram showing an electrical structure of an electronic camera according to the present invention. In FIG. 1, a CCD image sensor 3 is disposed behind a taking lens 1 and a mechanical shutter 2. The taking lens 1 for focusing subject light on the CCD image sensor 3 is adapted to be moved to a focal position by a lens drive circuit 7, which is activated in response to a control signal outputted from a central control circuit 8. Meanwhile, a shutter speed and shutter timing of the mechanical shutter 2 are set in response to a control signal which is outputted from the central control circuit 8 in association with timing of a release operation of a user.

The CCD image sensor 3 converts an optical image of a subject, which is formed on pixels of the CCD image sensor 3, into an electronic signal. In other words, the CCD image sensor 3 performs photoelectric conversion. A drive circuit 4 produces a transfer pulse and supplies this pulse to the CCD image sensor 3. On the basis of the transfer pulse produced by the drive circuit 4, the CCD image sensor 3 outputs an image signal.

A CDS (Correlation Double Sampling) circuit 5 for reducing noise is activated in response to a drive pulse outputted from the drive circuit 4. The CDS circuit 5 is connected to the CCD image sensor 3 and an output terminal of the CDS circuit 5 is connected to an A/D conversion circuit 6, which converts an analog signal into a digital signal and outputs the converted digital signal. Image data of each pixel of the CCD image sensor 3 is obtained via the A/D conversion circuit 6. For the obtained image data, processing of correction and so forth are performed in a signal processor 16. The processed image data is transmitted to a focus-area judging part 17.

Figure 2:
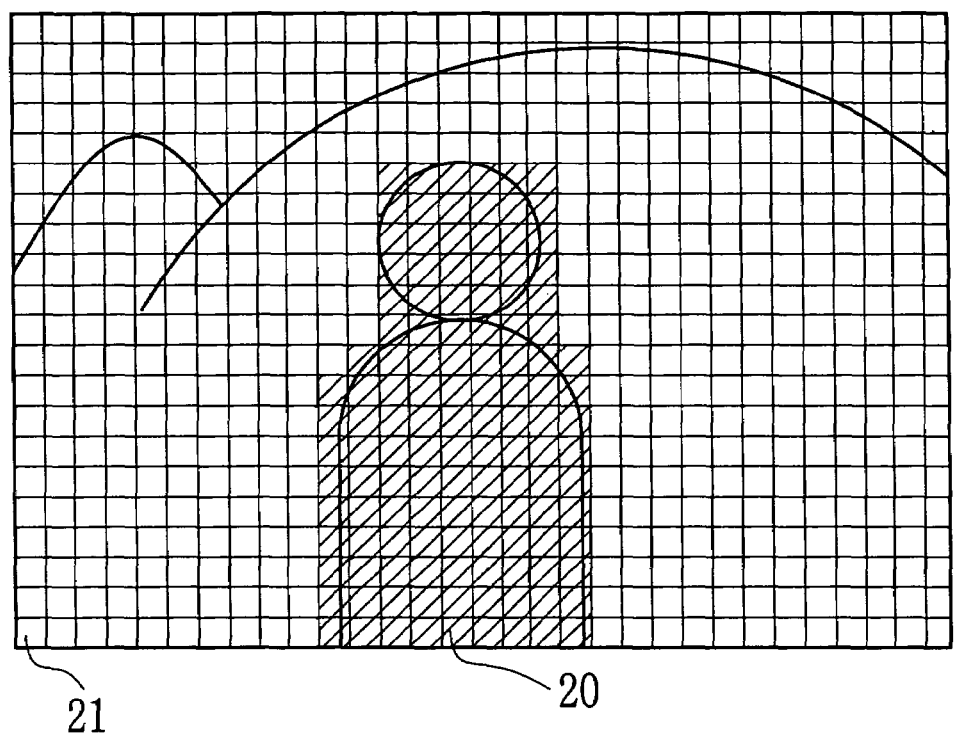
FIG. 2 is an illustration showing areas divided on the basis of AF evaluation values of an image.
Figure 3:
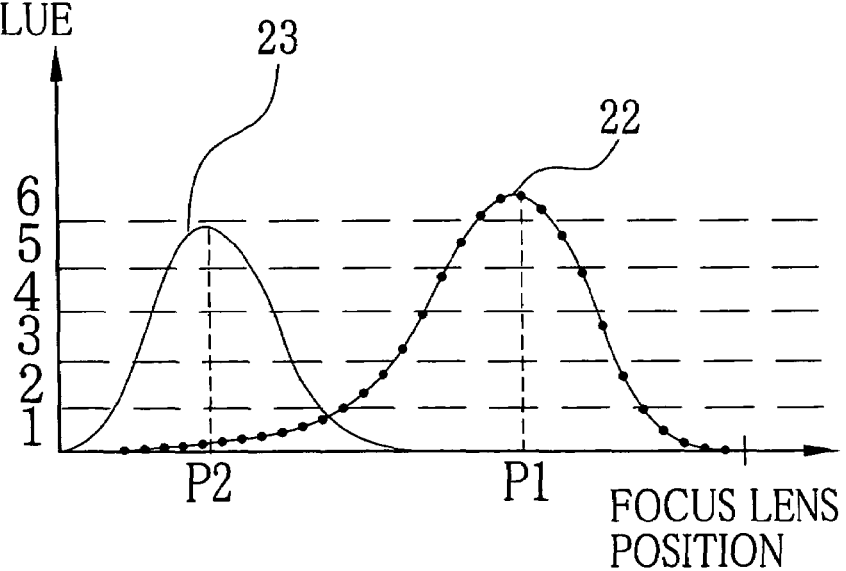
FIG. 3 is a graph showing properties of the AF evaluation values relative to positions of a focus lens.

The focus-area judging part 17 uniformly partitions the image into small blocks and judges an AF evaluation value of each of the blocks. Based on the AF evaluation values of the blocks, the focus-area judging part 17 divides the image into a focus area and a non-focus area. In this regard, the AF evaluation value changes in accordance with a position of a focus lens. The AF evaluation value means image definition calculated from an integrated high-frequency component of a brightness value of a prescribed region included in the subject image. FIG. 2 shows an example in that the image is divided into two areas, and FIG. 3 shows the AF evaluation values of these two areas. In FIG. 2, a person located at a central position is in focus, and the background including a mountain is out of focus. At this time, as shown in FIG. 3, the AF evaluation value is a peak of 6 with respect to a scope of the blocks wherein the person is taken in a condition that the current position of the focus lens is P1. In contrast, the AF evaluation value is 1 with respect to a scope of the background blocks. This is because a position P2 of the focus lens, which is different from the current position, is the focal position of the background blocks and the scope of these blocks is out of focus. On the basis of the judgment of the AF evaluation values, as shown in FIG. 2, the scope of the blocks taking the person is defined as the focus area 20 and the whole background including the mountain is differentiated as the non-focus area 21.

The two areas divided by the focus-area judging part 17 are respectively processed in different manners and are displayed on an LCD 12 in a state that perspective is emphasized. For example, the focus area 20 is processed by an edge emphasizing processor 14 so as to emphasize sharpness. On the other hand, the non-focus area 21 is processed by a low-pass filter processor 15 so as to exaggerate a blur. The focus area 20 and the non-focus area 21 are composed again as the sole image data in a subsequent monitor-image composing processor 13. The composed image is displayed on the LCD 12 via an LCD drive circuit 11. By the way, in case the AF evaluation values are identical relative to the entire image and it is impossible to divide the image into plural areas, the entire image is uniformly processed and is outputted to the LCD.

Figure 4:
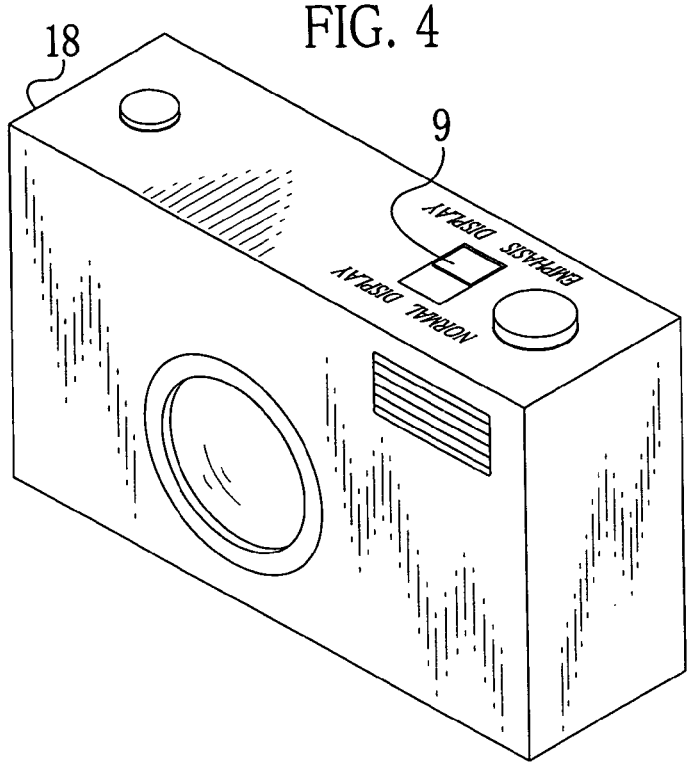
FIG. 4 is a perspective view of an electronic camera provided with a mode selection switch.
Figure 5:
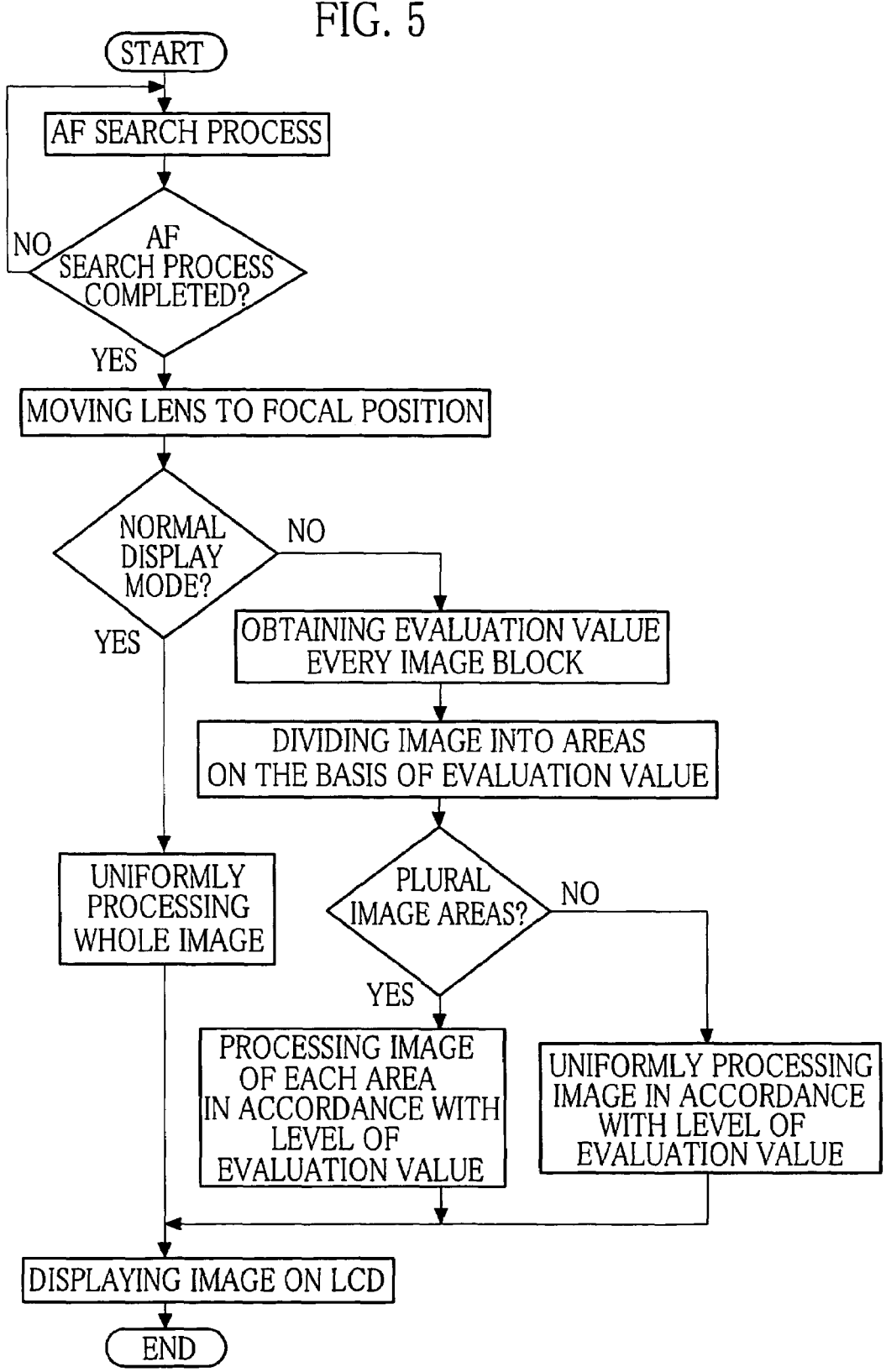
FIG. 5 is a flowchart showing an LCD display process of the electronic camera.

As to the process to be performed for each of the areas, the electronic camera 18 may be provided with a mode selection switch 9 as shown in FIG. 4 to select whether the process is performed or not. The mode selection switch 9 changes a display mode between a perspective emphasizing mode in which the process is performed, and a normal mode in which the process is not performed. The display mode may be changed by a user. In the case of changing the display mode, the central control circuit 8 executes a procedure along a flowchart shown in FIG. 5. At a shooting time, the electronic camera automatically moves the lens to the focal position after completing a search process of AF (Auto Focus). When the mode selection switch 9 is slid to a side of the normal mode, namely when the normal mode is set, the entire image is uniformly processed and is displayed on the LCD. And then, the procedure is terminated. In the meantime, when the mode selection switch 9 is slid to a side of the perspective emphasizing mode, namely when the perspective emphasizing mode is set, the taken image is partitioned into plural blocks and the evaluation values of the respective blocks are obtained. Based on the obtained evaluation values, the image is divided into areas. If the evaluation values are identical relative to the entire image, the image is not divided and is uniformly processed similarly to the normal mode. The uniformly processed image is displayed on the LCD. And then, the procedure is terminated. When the image is divided into plural areas, the image of each area is differently processed in accordance with a level of the evaluation value. After that, the image is displayed on the LCD and the procedure is terminated.

Figure 6:
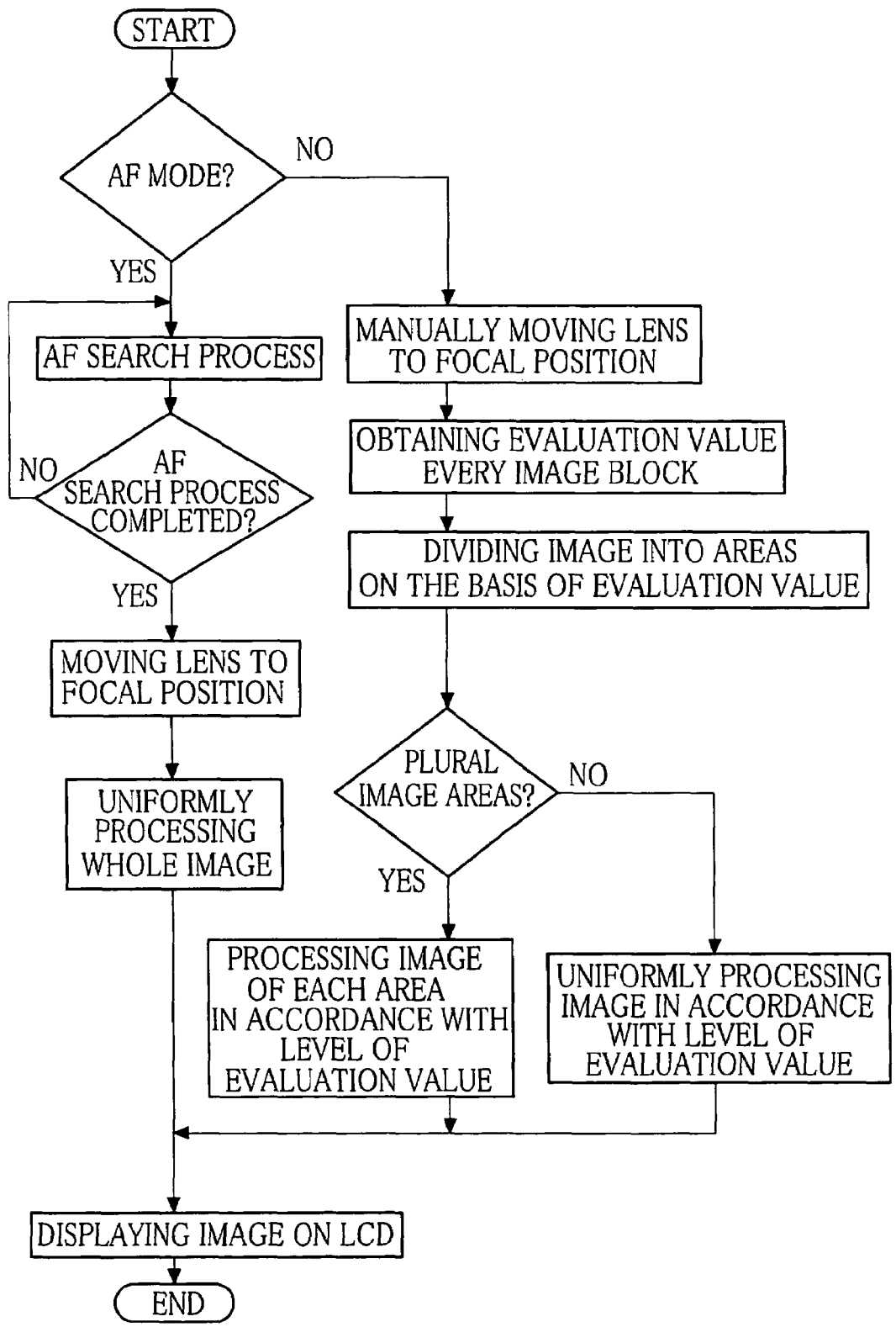
FIG. 6 is a flowchart showing another LCD display process of the electronic camera capable of changing an AF mode and a MF mode.

In a case that the electronic camera is provided with an AF/MF selection switch 10 for changing AF (Auto Focus) and MF (Manual Focus), the image of each area may be automatically processed only when the MF is selected. In virtue of this, convenience for a user is improved. In this case, the central control circuit 8 executes a procedure along a flowchart shown in FIG. 6. When the AF/MF selection switch 10 is set to the AF mode at a shooting time, the electronic camera automatically moves the lens to the focal position after completing the search process of AF. Then, the entire image is uniformly processed and is displayed on the LCD. After that, the procedure is terminated. Meanwhile, when the AF/MF selection switch 10 is set to the MF mode, a user manually adjusts the lens to the focal position. The image is partitioned into plural blocks and the evaluation values of the respective blocks are obtained. On the basis of the obtained evaluation values, the image is divided into areas. If the evaluation values are identical relative to the entire image, the image is not divided and is uniformly processed similarly to the AF mode. The uniformly processed image is displayed on the LCD and the procedure is terminated. When the image is divided into plural areas, the image of each area is differently processed in accordance with a level of the evaluation value. After that, the processed image is displayed on the LCD and the procedure is terminated.

TABLE 1

|  | KIND OF LENS | | |
| --- | --- | --- | --- |
|  | WIDE-ANGLE ZOOM | NORMAL ZOOM | TELEPHOTO ZOOM |
| FOCAL LENGTH WIDE END | EQUIV. TO 15 mm | EQUIV. TO 28 mm | EQUIV. TO 80 mm |
| FOCAL LENGTH TELE END | EQUIV. TO 30 mm | EQUIV. TO 85 mm | EQUIV. TO 300 mm |
| LEVEL DIVISION NUMBER OF EVALUATION VAL. OF WIDE END | THREE STEPS | FOUR STEPS | FIVE STEPS |
| LEVEL DIVISION NUMBER OF EVALUATION VAL. OF TELE END | FOUR STEPS | FIVE STEPS | TEN STEPS |
| EMPHASIS DEGREE OF WIDE END | SMALL | MIDDLE | LARGE |
| EMPHASIS DEGREE OF TELE END | MIDDLE | LARGE | LARGE |

Figure 7:
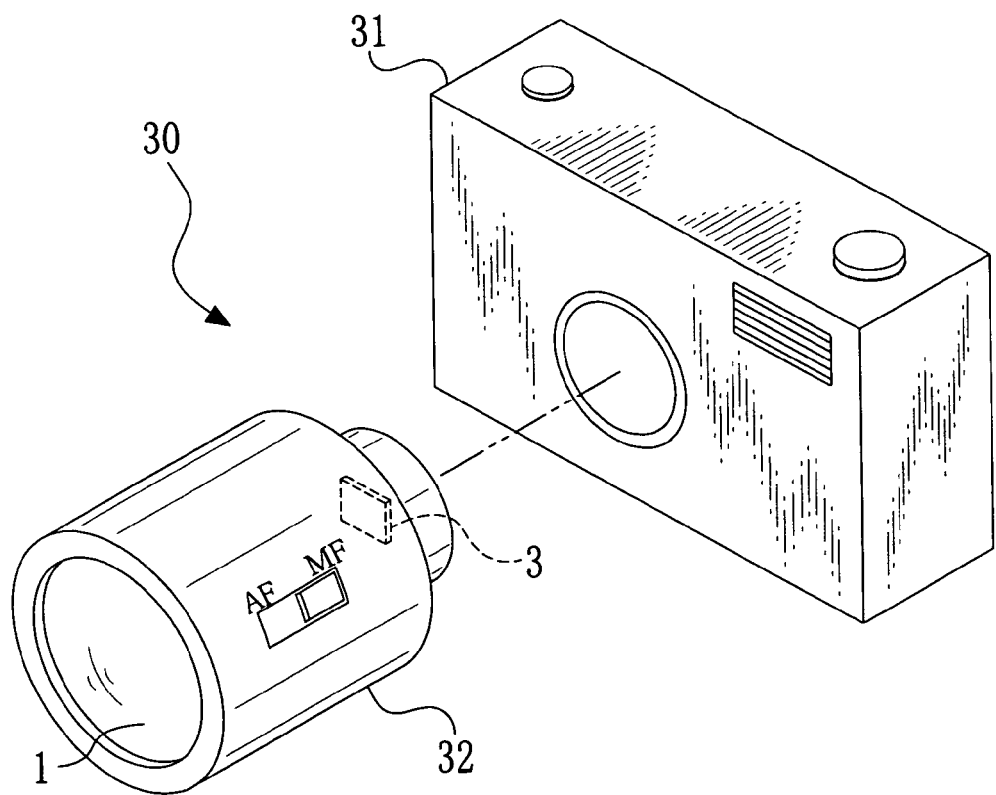
FIG. 7 is a perspective view of a camera system, a lens unit of which is detachable.

A camera system 30 shown in FIG. 7 comprises a lens unit 32, which contains an image sensor and is detachable from a camera body 31. In the camera system 30, it is effective to change the emphasis degree of image processing and the level division number of the AF evaluation value in accordance with the kind of the lens unit 32, such as shown in the above Table 1.

The perspective is easily expressed by a bright lens in accordance with an f-number thereof, because a depth of field is shallow. On the other hand, however, it is difficult to distinguish the perspective with a dark lens. In this case, it is effective to increase the emphasis degree. As to a lens having a macro function capable of performing closeup, it is effective to increase the level division number of the AF evaluation value, and at the same time, it is also effective to increase the emphasis degree.

TABLE 2

| MONITOR RESOLUTION | LOW | NORMAL | HIGH |
| --- | --- | --- | --- |
| LEVEL DIVISION NUMBER OF EVALUATION VAL. | SMALL | NORMAL | LARGE |
| EMPHASIS DEGREE | SMALL | MIDDLE | LARGE |

Further, it is also effective to adjust emphasis expression of focus condition in accordance with properties of the LCD. As shown in Table 2, it is possible to express proper perspective by changing the level division number of the AF evaluation value in accordance with the resolution of the LCD. In contrast to Table 2, it is also effective to increase the emphasis degree for the purpose of clarifying the perspective with the LCD having low resolution.

TABLE 3

| PIXEL NUMBER OF MONITOR | SMALL | NORMAL | LARGE |
| --- | --- | --- | --- |
| LEVEL DIVISION NUMBER OF EVALUATION VAL. | SMALL | NORMAL | LARGE |
| EMPHASIS DEGREE | SMALL | MIDDLE | LARGE |

Similarly, as shown in Table 3, it is possible to express proper perspective by changing the level division number of the AF evaluation value in accordance with the pixel number of the LCD. In contrast to Table 3, it is also effective to increase the emphasis degree for the purpose of clarifying the perspective with the LCD having a small pixel number. By constituting the camera system such that the user can set the level division number of the AF evaluation value and the emphasis degree, it is possible to provide the perspective desired by the user.

In the foregoing embodiments, the LCD is employed as the monitor of the electronic camera. The present invention, however, may be applied to an organic EL and so forth.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. An electronic camera having an image sensor for converting an image into an electronic signal, said electronic camera comprising:
    a focus-degree judging part for partitioning said image into plural blocks to judge a degree of focusing relative to each of said blocks during an image taking operation;
    an image dividing part for grouping the blocks on the basis of the judged degree of focusing to divide said image into plural areas every gathering of the grouped blocks during the image taking operation;
    a processor for performing different image processing with respect to each of said areas during the image taking operation; and
    a monitor for displaying the image processed by said processor during the image taking operation.

2. The electronic camera according to claim 1, wherein one of said areas is a non-focus area having the low degree of focusing, said processor performing said image processing for said non-focus area so as to emphasis a blur of the image.

3. The electronic camera according to claim 2, wherein said processor performs low-pass filter processing for said non-focus area.

4. The electronic camera according to claim 1, wherein one of said areas is a focus area having the high degree of focusing, said processor performing said image processing for said focus area so as to emphasis sharpness of the image.

5. The electronic camera according to claim 4, wherein said processor performs edge emphasis processing for said focus area.

6. The electronic camera according to claim 1, further comprising:
a mode changer for switching a display mode of said image between a first display mode and a second display mode, the identical image processing being performed for the entire image under said first display mode, and the different image processing being performed for each of said areas under said second display mode.

7. The electronic camera according to claim 6, wherein said mode changer is a switch disposed on an outer surface of said electronic camera and is manually operated from the outside.

8. The electronic camera according to claim 7, wherein said switch is of a slide type and is disposed on a top surface of said electronic camera.

9. The electronic camera according to claim 1, further comprising:
a focus changer for switching autofocus and manual focus, a display mode of said image being automatically changed from a first display mode, in which the identical image processing is performed for the entire image, to a second display mode, in which the different image processing is performed for each of said areas, when said manual focus is selected by said focus changer.

10. The electronic camera according to claim 1, wherein said image sensor is built in a detachable lens unit and a degree of emphasis of said image processing is changed in accordance with a kind of a lens contained in the selectively attached lens unit.

11. The electronic camera according to claim 1, wherein a degree of emphasis of said image processing is adjustable in accordance with properties of said monitor.

12. The electronic camera according to claim 1, wherein said monitor is a liquid-crystal display.

13. The electronic camera according to claim 1, wherein said monitor functions as an electronic viewfinder.

14. An electronic camera having an image sensor for converting an image into an electronic signal, said electronic camera comprising:
a focus-degree judging means for partitioning said image into plural blocks for judging a degree of focusing relative to each of said blocks during an image taking operation;
an image dividing means for grouping the blocks on the basis of the judged degree of focusing to divide said image into plural areas every gathering of the grouped blocks during the image taking operation;
an image processing means for performing different image processing with respect to each of said areas during the image taking operation; and
a monitor for displaying the image processed by said processor during the image taking operation.

* * * * *